United States Patent
Kolluri et al.

[11] Patent Number: 5,962,138
[45] Date of Patent: *Oct. 5, 1999

[54] PLASMA DEPOSITED SUBSTRATE STRUCTURE

[75] Inventors: Omprakash S. Kolluri, Campbell; Robert G. Johanson, Sunnyvale, both of Calif.

[73] Assignee: Talison Research, Inc., Cupertino, Calif.

[ * ] Notice: This patent is subject to a terminal disclaimer.

[21] Appl. No.: 08/976,827

[22] Filed: Nov. 24, 1997

Related U.S. Application Data

[62] Division of application No. 08/575,161, Dec. 19, 1995, Pat. No. 5,723,219.

[51] Int. Cl.$^6$ .................................. C08F 2/46; C08J 7/18
[52] U.S. Cl. .................. 428/411.1; 428/407; 428/423.5; 428/474.4; 204/165; 427/488
[58] Field of Search ................................ 428/407, 411.1, 428/423.5, 474.4, 480; 204/165, 168, 169; 427/488

[56] References Cited

U.S. PATENT DOCUMENTS

| | | | |
|---|---|---|---|
| 4,587,329 | 5/1986 | Tomalia et al. | 528/363 |
| 4,693,799 | 9/1987 | Yanagihara et al. | 204/165 |
| 5,342,693 | 8/1994 | Winters et al. | 428/447 |
| 5,393,795 | 2/1995 | Hedstrand et al. | 521/134 |
| 5,444,811 | 8/1995 | Yoshimura et al. | 385/141 |
| 5,449,383 | 9/1995 | Chatelier et al. | 623/1 |
| 5,723,219 | 3/1998 | Holluri et al. | 428/411.1 |

OTHER PUBLICATIONS

Gombotz et al; "Functionalization of Polymeric Films by Plasma Polymerization of Allyl Alcohol and Allylamine"; Pol.Mat.Sci & Eng (1990).

Greisser et al; "Characterization of Plasma Polymer Films from Amines and other Polar Monomers"; Polymeric Materials Sci & Eng, vol. 56, pp. 720–725 (1987).

Sanchez et al; "Plasma Deposition of Copolymers and Their Permeation Characteristics", Polymeric Materials Science & Eng. vol. 56, pp. 792–796 (1987).

Ward; Surface Modification Prior to Surface Formation: Control of Polymer Surface Properties via Bulk Composition; Medical Plastics & Biomaterials, pp. 34–41 (Spring 1995).

*Primary Examiner*—Daniel Zirker
*Attorney, Agent, or Firm*—Francis Law Group

[57] ABSTRACT

A substrate structure having three-dimensional functional film network comprising a plurality of radio frequency discharge plasma film layers. The plasma film layers include a first layer, comprising a plurality of a first functional group, and a second layer, comprising a plurality of a second functional group. The employment of three-imensional film networks with desired functional groups located either on the periphery or both the periphery and interstitial spaces of the networks provides means for significantly increasing the surface functional density.

11 Claims, No Drawings

PLASMA DEPOSITED SUBSTRATE STRUCTURE

This application is a division of application Ser. No. 08/575,161, filed Dec. 19, 1995, now U.S. Pat. No. 5,723,219.

BACKGROUND OF THE INVENTION

1. Field of the Invention

The present invention relates to functional film networks, and in particular to sequentially deposited radio frequency plasma film layers having an open network structure, thereby increasing interstitial spacing between plasma film layers and providing access to functional groups contained therein.

2. Previous Art

The surfaces of polymeric, metal and ceramic materials are important in many applications. Often these surfaces must be modified for a specific use. For example, surfaces of medical devices implanted in the body must have biocompatible surfaces.

Different methods are generally employed to modify the surfaces of polymers, as opposed to metal and ceramic surfaces. Several conventional methods of surface modification employ wet chemical processes. Most recently developed are energetic methods of surface modification. Each of these methods for each type of material is discussed below.

Wet chemical surface modification of metals and ceramics is accomplished either by forming composites where the metals and ceramics are blended with matrix resin, or by coating these substances with organic coatings.

A typical wet chemical approach of surface modification of polymeric materials employs acids to etch and oxidize the surface. Other approaches employ solvent swelling and penetration of topical coatings into the swollen surfaces. Upon evaporation of the solvent, the coating is incorporated into the top layer of the polymeric article.

There are many problems associated with use of solvents and other wet chemical methods for modifying surfaces. For example, the use of wet chemical methods to modify surfaces can take several steps to accomplish. The chemicals used are often messy, corrosive and toxic to both humans and the environment. There are often many steps, such as the application reaction, rinsing, and neutralization. It is not easy to change steps if sequentially applying several chemicals. Not all surface areas of the material to be modified are accessible to the wet chemicals, such as blind vias and other hidden surfaces. The monomers used must be reactive. Yields are low and solvents can leave residues on the surface leading to contamination of the surface. Additionally, some wet chemical methods can also damage the surface that one is attempting to modify.

Surface composition of polymeric materials is commonly modified by blending additives into the bulk polymer before fabrication and allowing surface active agents to migrate to the surface. The end groups of the polymer chain can also be modified with specific functional groups. Changes to the bulk of the polymer are thus minimized. The added mobility of the end groups relative to the polymer backbone appear to facilitate self-assembly of the molecular overlayers by the surface active end blocks.

A major drawback of this method of surface modification is that there is a limit to the chemical functional density that can be incorporated without significantly altering the basic nature of the material.

Energetic processes (i.e., plasma) for surface modification of polymeric materials have also been gaining acceptance in a number of industries. In plasma modification, the bulk properties of the original polymer are retained while chemically changing only the top 20 Å of the surface. Polymers such as polypropylene, polystyrene, polyester, Teflon® and other commercially available polymers have been modified using this method. For example, a polystyrene material that normally does not contain nitrogen can be modified using ammonia gas ionized in a radio frequency (RF) field. This method commonly employs a vacuum chamber, means for introducing a reactive gas such as oxygen, ammonia or nitrous oxide into the chamber and RF energy as tools in the modification process.

In plasma surface modification, the gas employed for modifying the surface of the polymer is introduced into the vacuum chamber containing the surface to be modified. The gas is ionized using RF energy and this ionized gas interacts with the surface of the material. Ionized gases contain a mixture of highly reactive chemical species that include free radicals, electrons, ions and metastable reactive species. These species easily break the chemical bonds on the surface of polymeric materials and substitute the desired chemical groups on the surface of the material. In this manner carbonyl, carboxylic acid, hydroxy, and amine functional groups have been incorporated into and hence become a part of polymeric surfaces.

The design of the reaction chamber, the distribution of power, the excitation frequency, and the gas dynamics are critical factors influencing the properties and efficiency of plasma reactions. Extensive work has been published that shows a direct correlation between excitation frequency and plasma reactivity.

Unlike polymeric materials, metals and ceramics do not contain bonds that can be easily broken. Plasma film deposition offers a means for modifying the surfaces of such materials. In this process monomers consisting of polyatomic molecules are typically ionized using RF energy.

Using plasma polymerization (or plasma film deposition), functional groups can be incorporated into or deposited on any surface, including polymers, metals, ceramics and composites. The films deposited using plasma polymerization are compositionally very different from the polymers formed in bulk processes of polymeric materials using these same monomers. Materials such as methane, propane, and other saturated hydrocarbons are commonly employed to deposit plasma polymerized films on metals and ceramics. Additionally, the film can be comprised of amines, acids, methacrylates, glycidyls or mixtures such as methane and amine, or methane and acid.

When depositing functional films on surfaces using plasma film deposition, the functional density in most cases is limited to that achieved by a monolayer. For example, 11 atom % nitrogen in films deposited from diaminocyclohexane on polystyrene was reported in *Clinical Materials*11 (1992). This concentration equates to a concentration of 1 nmoles/cm$^2$ of primary amines on the surface or a coverage of one monolayer of amine on the surface.

The difficulty with most single monolayers of functional density is that there are a limited number of chemically reactive sites that are available for interaction with the desired coating material such as a biomolecule or the matrix resin of a composite. When the number of functional groups available on the surface of a substrate is limited, the benefits that can be achieved are also limited. In the case of composites, the number of locations where the matrix resin is bonded to the reinforcing materials is limited and the ultimate strength of the composite material is also limited. In the case of biomolecule attachment, lower functional densities decrease the amount of these materials that can be anchored on the surface. Often attachment of more than one biomolecule is desired to facilitate multiple performance attributes. In these cases the amount of any given material that can be attached is decreased and may be below the minimum threshold needed for the desired performance.

Plasma polymerized films have also been deposited using acrylic acid which produces films with a high density of functional groups. The density is achieved by building a linear polymer of acrylic acid on the surface. Additionally, soft plasma or pulse plasma has been employed with variable duty cycle to preserve the functional groups of films during deposition using plasma polymerization. In addition to only leaving a single monomer layer deposited, these methods also depend on building long linear chains anchored to the surface to generate the high functional densities that are desired.

Further, in plasma deposition, the energy per mole of monomer determines the number of bonds broken. At high power and low monomer concentration (hard plasma) more of the bonds are broken and less of the functional character is retained.

It is known that the power applied, the frequency of the pulse, and the duty cycle can all be varied to preserve the functional nature of the deposited film. Indeed, it has been found that by using high power coupled with a low duty cycle, a higher portion of the functional nature of the deposited film is maintained. A major drawback of these methods is that the films that are deposited are mechanically weak and can be easily abraded away. Furthermore, during plasma film deposition, there are two competing processes that occur. One is the deposition of the film and the other is the ablation of the film being deposited. The degree to which one process predominates is a function of both the process conditions being employed and the chemical nature of the film being deposited. In an attempt to build sufficient functional density on the surface using plasma polymerization, there is also an inherent risk that some of the film being deposited will be ablated away due to the process conditions that need to be employed.

Even if sufficiently long chains of reactive groups could be deposited, the groups at the lower regions of the film may not be as easily accessible for interactions with coating materials as is desired. For example, in films deposited from allylamine, it has been found that a primary amine concentration on the surface is not as high as would be expected from the nitrogen content of the surface measured by ESCA. It has been concluded that perhaps some of these functional groups were buried and not accessible on the surface for reaction with the derivatizing reagents used in their analysis.

Finally, star polymers have been created employing wet chemical methods. For example, the synthesis of star polymers have been reported after reacting multifinctional isocyanates with glycols.

In U.S. Pat. Nos. 4,507,466; 4,588,120; 4,568,737; 4,587,329; and 4,694,064, herein incorporated by reference, Tomalia, et al. disclose synthesis of giant star polymers commonly referred to as "dendrimers". In the noted patents, sequential reactions of methylacrylate and ethylenediamine are achieved employing methanol as a solvent. Star polymers offer several advantages, namely, a network structure that provides physical strength and the ability to provide high chemical functional densities.

There are several problems associated with star polymers. First, the conventional method of building molecules from the core produces only small quantities of star polymers and requires several days to accomplish. Second, large scale synthetic methods remain to be developed.

Additionally, in order for star polymers (and dendrimers) to be useful in modifying surfaces of materials, star polymers must be anchored to reactive sites on surfaces using reactive cores as attachment points. This type of anchoring has many problems. For example, it is difficult to attach dendrimers to surfaces because the anchoring point of the core is located in the center of the star. Thus, anchoring can only occur through a reactive group on the periphery of the dendrimer. Even in these cases the substrate to which the dendrimer is attached must be modified by some means to allow attachment.

Steric hindrance of the star also limits the amount of dendrimers that can be attached to a surface. Additionally, it is easy to break this single attachment.

In biomedical applications, for example, a stent or other object placed in the body, the medical devices must have the biomedically active agent fixed to and completely cover the surface. Dendrimers provide space between each attachment, leaving substrate surface areas exposed to body fluids.

Most plasma processing techniques employ the deposition of functional groups on the surface as the end point of their process rather than as an intermediate link in an ultimate structure. Therefore, practitioners employ conventional materials such as oxygen, ammonia and other such materials to deposit functional groups on the surface. For example, in U.S. Pat. No. 5,342,693, herein incorporated by reference, a glassy film is deposited using siloxanes ionized in a plasma. Using the methods of plasma surface modification, ammonia is then used to provide amine functional groups on the surface. Other materials are subsequently attached to this functional group using wet chemical methods.

Therefore, what is needed is (i) a sequentially deposited film network comprising several RF plasma layers and having a strong interface, (ii) a method to provide high functional density film networks with controllable amounts of crosslinking for accessible functional groups, and (iii) means for providing large scale RF plasma deposition that can be accomplished in a relatively short time without employing wet chemical methods.

SUMMARY OF THE INVENTION

The present invention substantially reduces or overcomes all of the problems associated with the prior art. The invention provides a novel three-dimensional functional film network and a rapid process for producing same. The employment of three dimensional film networks with the desired functional groups located either on the periphery or both the periphery and interstitial spaces of the networks of the invention offers a means for significantly increasing the surface functional density in a novel manner. The spatial configuration of the network, and thereby access to the internal structure of the network, is controlled by selecting which functional groups are sequentially deposited. The novel process of the invention employs sequential radio frequency (RF) deposition, thereby allowing for large scale synthesis. Additionally, no wet chemistry is employed, thereby decreasing production time from days to minutes.

The present invention provides a "forest" or a "mushroom" with many functional groups on the periphery. The approach has not been previously achieved using plasma deposition and it is not readily obvious or feasible.

In the present invention, sequential deposition is coupled with an infinite variation in the type and functionality of the monomers employed to determine the ultimate structure of the film that is deposited. These variables are employed in addition to the variation of process conditions to control film structure.

Accordingly, it is an object of this invention to provide a functional film network comprising a plurality of sequentially deposited RF plasma layers.

It is also an object of this invention to provide high functional density film networks with controllable amounts of crosslinking and interstitial spacing, providing access to the functional groups contained therein.

It is also an object of this invention to provide means for large scale depositions that can be accomplished in a relatively short time.

In accordance with the above objects and those that will be mentioned and will become apparent below, the three-dimensional functional film network in accordance with this invention comprises a plurality of radio frequency discharge plasma film layers. The plasma film layers include a first layer and a second layer disposed immediately adjacent said first layer. The first layer includes a plurality of a first functional group and the second layer includes a plurality of a second functional group.

An advantage to this invention is that it provides a film network structure having increased interstitial spacing with reactive functional groups disposed within the network structure. These reactive sites may act as ionic binding sites for securing biomolecules within the networks.

DETAILED DESCRIPTION OF THE INVENTION

The plasma polymerization technique of the present invention offers a unique method for building functional network structures. In general, a layer of one class of monomers is alternated with a layer of another class of monomers.

The specific monomer selected depends on the type of functional surface that is desired. In some cases, a mixture of gases is employed to obtain the desired surface chemistry.

The class of monomers selected dictate the type and density of the network that is developed. Examples of functional groups that can be incorporated in the network structure of the present invention include, but are not limited to, epoxy (oxiranyl), amino, carboxy, hydroxy, isocyanto, amido and sulfhydryl groups.

Monomers sources of epoxy or oxiranyl functional groups include, but are not limited to, allyl glycidyl ether, glycidyl methacrylate, glycidyl isopropylether, glycidyl butyrate, 3-glycidoxypropyltrimethoxysilane and mixtures thereof.

Monomer sources of alcohol functional groups include, but are not limited to oxygen; water; saturated alcohols such as methyl alcohol, ethyl alcohol, propyl alcohol and its isomers, butyl alcohols and its isomers and saturated alcohols and aryl alcohols such as benzyl alcohol; unsaturated alcohols such as allyl alcohol, vinyl alcohol, 2-hydroxyethyl acrylate, 2-hydroxyethyl methacrylate and other similar compounds; glycols and ethers such as ethylene glycol, propylene glycol, tetrahydrofuran, diethylene glycol dimethyl ether, tetraethylene glycol dimethacrylate and triethylene glycol dimethyl ether; mixtures of the above compounds; and mixtures of a hydrocarbon such as methane or ethylene and the classes of compounds named herein.

Monomer sources of isocyanate functional groups include, but are not limited to, allyl isocyanate, toluene-2, 4-diisocyanate, 1,4-diisocyanatobutane, ethyl isocyanate, hexamethylene diisocyanate, toluene-2,6-diisocyanate and mixtures thereof.

Monomer sources of triazine functional groups include, but are not limited to, acrylonitrile, 2,4-diamino-6-methyl-1,3,5-triazine, 1-trimethylsilyl- 1,2,4-triazole and mixtures thereof.

Monomer sources for amine functional groups include, but are not limited to, unsaturated amines such as allylamine and vinyl amine; primary amines such as methylamine, butyl amine, propylamine, hydroxyethyl amine and other alkyl amines; alkane diamines such as ethylenediamine, 1,3 diaminopropane, 1,4 diamino butane, 1,5 diamino pentane, 1,6 diamino hexane, 1,7 diamino heptane, 1,8 diamino octane; polyalkylene polyamines such as diethylenetriamine, dipropylene triamine, dibutylenetriamine, triethylenetetramine, tripropylenetetramine, tributylenetetramine, N, N'-bis(2-aminoethyl)-1,3-propanediamine, bis(3-aminopropyl) amine; aminosilanes such as 3-Aminopropyltrimethoxysilane, 3-Aminopropyltriethoxysilane, 3-Aminopropylmethyldiethoxysilane, 3-(3-Aminophenoxy) propyltrimethoxysilane, 3-(2-Aminoethylamino) propyltrimethoxysilane, hexamethyldisilazane, and other similar compounds; heterocyclic amines such as ethylene amine, piperidines, pyrroles and pyrrolidines; aromatic amines such as aniline; and various other amines and amino compounds such as mercaptoethylamine, acrylonitrile, acetonitrile, butyronitrile, and 1,4 diaminocyclohexane; mixtures of the above compounds; and mixtures of a hydrocarbon such as methane or ethylene and the classes of amino compounds named herein.

Monomer sources for carboxylic acid functional groups include, but are not limited to, oxygen, carbon dioxide and compounds such as acetic acid, propionic acid, butyric acid, 2-methyl propionic acid, n-pentanoic acid, 4-methyl butanoic acid, n-hexanoic acid; unsaturated acids such as acrylic acid, methacrylic acid, 2-butenoic acid, and cinnamic acid; mixtures of the above; and mixtures of a hydrocarbon such as methane or ethylene and the classes of compounds named herein.

Monomer sources for sulfhydryl groups include, but are not limited to, compounds such as 3-sulfhydryl propene, hydrogen sulfide, 2-sulfhydrylethene and mixtures thereof.

Monomer sources for amido functional groups include compounds such as acrylamide and N,N-dimethylacetylamide. Additionally, amido groups can be formed by neutralizing terminal amine with an acid or a terminal carboxylic acid function with an amine.

Other monomer types that can be used in constructing the network structure irrespective of their ability to contribute a functional group within or on the periphery of the network structure include, but are not limited to, compounds such as allyl acetate, allyl methacrylate, ethyl acrylate, methyl acrylate, methyl methacrylate, ethyl methacrylate, butyl acrylate, tert-butyl acrylate, butyl methacrylate, cyclohexl methacrylate, ethylhexl acrylate, 2-ethylhexyl methacrylate. If multifunctional acrylates such as ethylene glycol dimethacrylate are used, these monomers will provide additional sources of branching besides the aniines.

Although specific compounds that can be used to form the desired functional groups in the network of the present invention have been named, it is to be understood that any materials that can be introduced in an RF plasma reaction chamber, either as a vapor or an aerosol mist, that can be subsequently ionized by the application of RF energy, and that belong to the family of compounds named herein, are effective sources of such functional groups.

Table I lists reactive monomer pairs that can be employed within the scope of this invention to initiate the extended chains of the functional film networks. For example, a plasma film layer having a functional group selected from the first column will build a new layer in the film network if reacted with a plasma film layer having its functional group pair in the second column. In reaction No. 1, a previous layer having amine is reacted with monomers that will deposit ethylene functional groups, producing two network branches in the new layer of the network.

TABLE I

Reactive Pairs that Initiate Extended Chains

| | Surface or Chain-End Function | Reacts With | To Produce |
|---|---|---|---|
| 1. | $-NH_2$ | $CH_2=CHX$ | $-N(CH_2CH_2X)_2$ |
| 2. | $-NH_2$ | $O=C(R_1)(R_2)$ | $-N=C(R_1)(R_2)$ |
| 3. | $-COOH$ | $NH_2R$ | $-CONHR$ |
| 4. | $-COOH$ | $NHR_1(R_2)$ | $-CO-N(R_1)(R_2)$ |
| 5. | $-COOH$ | $NH_2(CH_2)_nNH_2$ | $-CONH(CH_2)_nNH_2$ |
| 6. | $-COOR$ | $NH_2R$ | $-CONHR$ |
| 7. | $-COOR$ | $NHR_1(R_2)$ | $-CO-N(R_1)(R_2)$ |
| 8. | $-COOR$ | $NH_2(CH_2)_nNH_2$ | $-CONH(CH_2)_nNH_2$ |
| 9. | $-CHO$ | $NH_2R$ | $-CH=NR$ |
| 10. | $-NCO$ | $NH_3$ | $-NHCONH_2$ |
| 11. | $-NCO$ | $NH_2R$ | $-NHCONHR$ |
| 12. | $-NCO$ | $NHR_1(R_2)$ | $-NHCO-N(R_1)(R_2)$ |
| 13. | $-CH-CH_2$ (epoxide) | $RNH_2$ | $-CH(OH)-CH_2NHR$ |
| 14. | $-CH-CH_2$ (epoxide) | $NHR_1(R_2)$ | $-CH(OH)-CH_2NR_1(R_2)$ |
| 15. | $-CH-CH_2$ (epoxide) | $ROH$ | $-CH(OH)-CH_2OR$ |
| 16. | $-CH-CH_2$ (epoxide) | $NHR_1(R_2)$ | $-CH(NH_2)-CH_2NR_1(R_2)$ |
| 17. | $-CH-CH_2$ (aziridine, NH) | $ROH$ | $-CH(NH_2)-CH_2OR$ |

TABLE I-continued

Reactive Pairs that Initiate Extended Chains

| Surface or Chain-End Function | Reacts With | To Produce |
|---|---|---|
| 18. —OH | | —CH₂—CHR (with epoxide O) |
| 19. —OH | RSO₂Cl | —OSO₂R |
| 20. (triazine ring N—C/N=C structure) | | |
| 21. —SH | | | wherein X is —COOH, —COOR, —OH, —NH₂, —NH₂R, —NCO,

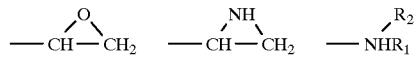

and R, R₁ and R₂ represent aliphatic or aromatic hydrocarbons that can be introduced in an RF plasma reaction chamber, either as a vapor or an aerosol mist that can be subsequently ionized by the application of RF energy.

Additionally, the R, R₁ and R₂ groups may contain additional functional groups to allow further branching.

The reaction illustrated in line 5 of Table 1 changes a terminal —COOH group to a terminal —NH₂ group, with a variable chain extension length (n). Reaction No. 8 changes a terminal —COOR group to a terminal —NH₂ group, with a variable chain extension length (n). The reaction of line 19 is employed as a wet chemical step prior to affixing biomaterial. In reaction No. 20, the triazine source is acrylonitrile.

According to a preferred embodiment of the invention, the construction of the film network occurs as follows: an initial plasma polymerized film layer is first deposited on the substrate. This initial layer can be chosen from the class of compounds such as ammonia, unsaturated amines, primary amines, aliphatic diamines, polyalkylene polyamines, heterocyclic amines, nitrites, pyrroles, pyrrolidines, aminosilanes and mixtures thereof such that an amine functional group is formed on the surface. The initial layer may also comprise oxygen, water, carbon dioxide, and mixtures of a hydrocarbon and the above referenced compounds. The second plasma deposited layer is applied using the class of compounds consisting of; (i) saturated carboxylic acids such as acetic acid, propionic acid, butyric acid, 2-methyl propionic acid, n-pentanoic acid, 4-methyl butanoic acid, n-hexanoic acid, and unsaturated carboxylic acids such as acrylic acid, methacrylic acid and similar unsaturated acids; or (ii) esters such as methyl acrylate, methylmethacrylate, glycidyl methacrylate and similar class of compounds; or (iii) keto esters such as carbonyl-bis-3,3'-methyl propionate and similar compounds; or (iv) oxygen and carbon dioxide (v) mixtures of hydrocarbons and the class of compounds named in groups (i) through (iv). The second layer can also be constructed by using monomers that consist of a mixture of compounds chosen from groups (i) and (ii). Of the three classes of compounds mentioned, it is preferred that the monomer for the second layer be chosen from the class of compounds described in groups (i) and (ii).

The plasma deposited film network can also be initiated by depositing a film using the monomers from the class of compounds consisting of; (i) saturated carboxylic acids such as acetic acid, propionic acid, butyric acid, 2-methyl propionic acid, n-pentanoic acid, 4-methyl butanoic acid, n-hexanoic acid, and unsaturated carboxylic acids such as acrylic acid, methacrylic acid, and other similar materials; or (ii) esters such as methyl acrylate, methyl methacrylate, glycidyl methacrylate and other similar materials; or (iii) oxygen and carbon dioxide; or (iv) mixtures of hydrocarbons and the class of compounds named in groups (i) through (iii). This first layer can also be formed from a mixture of monomers described in groups (i), (ii) and (iv) or the mixtures described in group (v). The second layer of plasma polymerized film is then deposited from the group consisting ammonia, unsaturated amines, primary amines, aliphatic diamines, polyalkylene polyamines, heterocyclic amines, nitrites, pyrroles, pyrrolidines, aminosilanes and mixtures thereof or mixtures of hydrocarbons and the class of amino compounds named herein, as described above.

Employing one combination of materials as an example, Steps 1–5 below illustrate the step by step growth of the functional film network on polystyrene according to the invention. The process also illustrates how the overall network structure is achieved. The sequential deposition process allows for evaluation of the functional character at each step. The employment of difunctional amines such as ethylene diamine (See Formula 1) or 1,6 hexanediamine with allylic or aliphatic acids, such as acrylic acid, will yield a network according to final Steps 4 and 5, as illustrated in Formulas 7 and 8 below.

The objective of Step 1 below, is to provide a set of reactive sites for branching. Any monomer from the first column of Table I can be employed in the first step. In the method shown, an amine having an R group is plasma polymerized, producing many amine functional groups on the polymeric surface for the next level of branching. The R group of the amine is generally broken, leaving R₁ and R₂ groups as part of the functional groups attached to the surface, or left unattached in the reaction chamber.

STEP 1

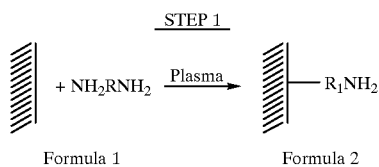

Formula 1　　　　　Formula 2

In Step 2 below, a matching pair is selected from the second column of Table I. During plasma deposition the matching pair will now attach to an amine functional group previously attached to the surface during Step 1. In Step 2 below, an acrylic acid is shown. The two hydrogen bonds on each amine are easily broken. The process can be adjusted so that there is more than one carboxylic acid deposited. For example, if pulse plasma is employed as illustrated in Step 2 below, two carboxylic acid units will attach at the nitrogen, creating two branches.

Step 2

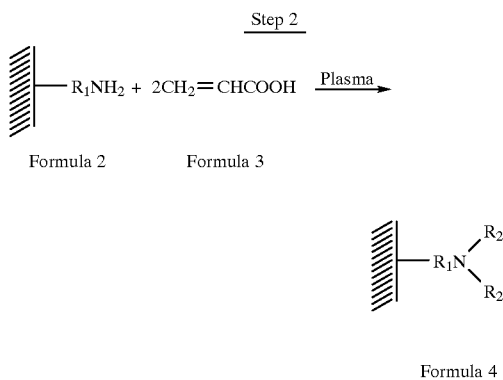

Formula 2　　Formula 3

Formula 4

The purpose of Step 3 is to provide another point for branching. For example, as illustrated below, an ethylene diamine plasma is again employed. Reacting these amines with the carboxylic acid functional groups deposited in Step 2 provides amides. At the other end of each amide is an amine which provides another opportunity to provide two branches.

STEP 3

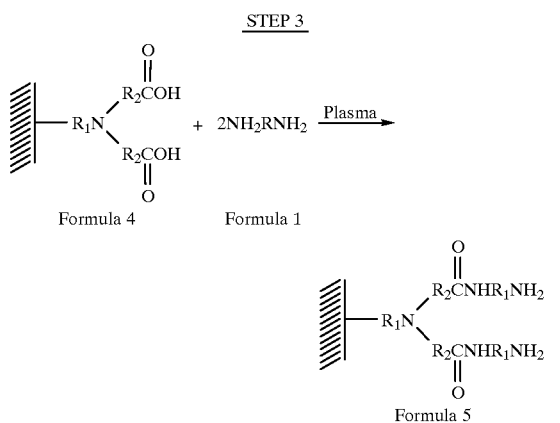

Formula 4　　Formula 1

Formula 5

Steps 1–3 provide the first generation of the film network. This first layer has a strong interface with the surface, as opposed to other networks formed from long, linear branches and star polymers being attached at the cores to a surface. The strong interface of the present invention covers all of the surface and is not ablated during additional layer depositions. Additionally, there is no problem of steric hindrance when attaching additional functional groups.

When using the monomers illustrated in Steps 1–3, the surface layer will have many functional amines. Branching is not accomplished when amines are deposited. However, when carboxylic acids are deposited onto amine functional groups, branching is possible.

As illustrated in Steps 4 and 5 below, the sequential deposition method of the invention is employed to produce a second generation film network. In Step 4, the two hydrogen bonds on each amine are again easily broken, as previously shown in Step 2. The process can be adjusted so that there is more than one carboxylic acid deposited. For example, if pulse plasma is employed as illustrated in Step 4 below, two more carboxylic acid units will attach at the nitrogen, providing four branches for each amine functional group attached to the surface.

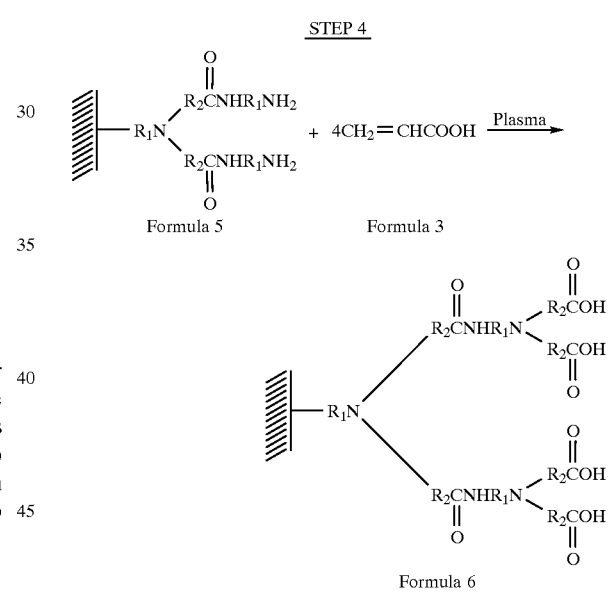

Formula 5　　Formula 3

Formula 6

STEP 5

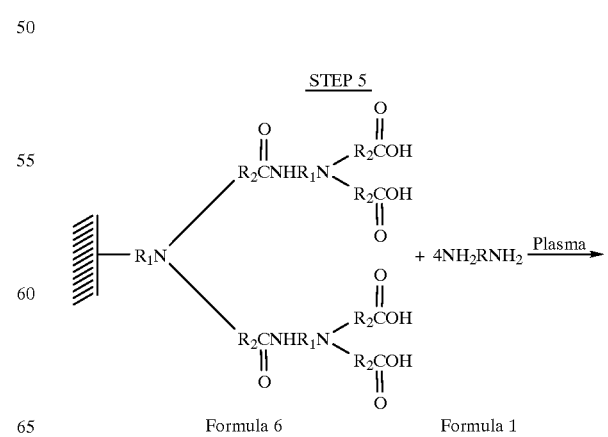

Formula 6　　Formula 1

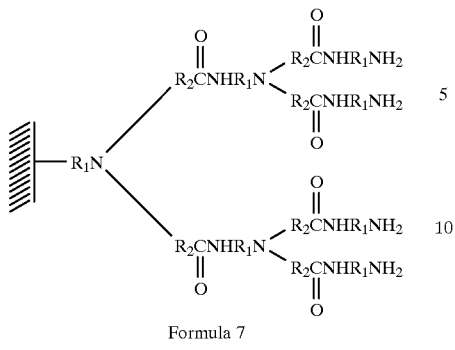

Formula 7

The process of sequential deposition can be continued through several iterations until the desired final network structure is achieved. The process is terminated only when the desired thickness of the film network has been deposited on the substrate of choice and the target chemical functional group density has been incorporated into the network.

A structure beginning with a trifunctional amine on the surface is illustrated below in Formulas 8–11. By using a tetrafunctional functional monomer such as triethylenetetramine, $NH_2CH_2CH_2NHCH_2$——$CH_2NHCH_2CH_2NH_2$, cleavage of the molecule can occur in a plasma at the location shown by the dotted line. In a manner analogous to deposition from a diamine, and as shown below, a surface with three attachment points can be obtained, one at the secondary amine and two at the primary amine site.

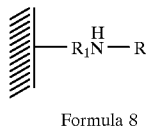

Formula 8          Formula 3

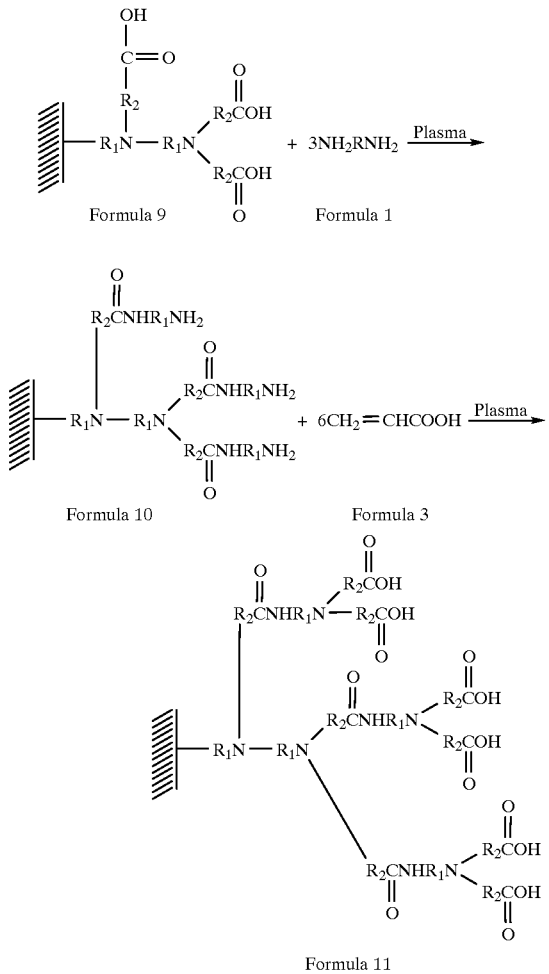

A structure with linear amine chain as the starting group is shown in Formulas 12–15 below. When a monomer such as allylamine is employed as the starting monomer, a pulse plasma can be employed to build a linear chain consisting of several amine groups, each of which can act as a branch site.

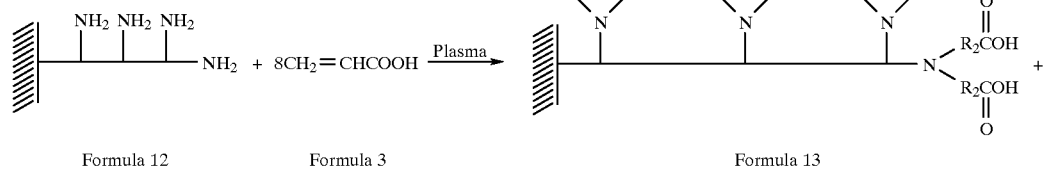

Formula 12          Formula 3          Formula 13

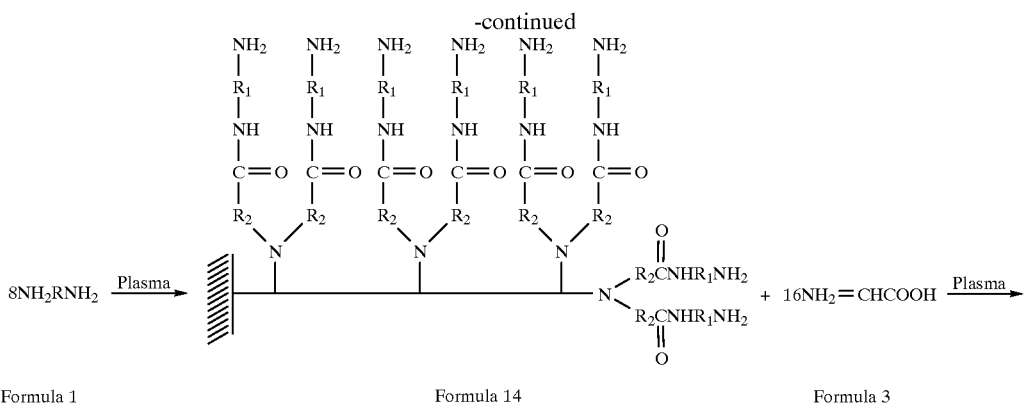

Formula 1      Formula 14      Formula 3

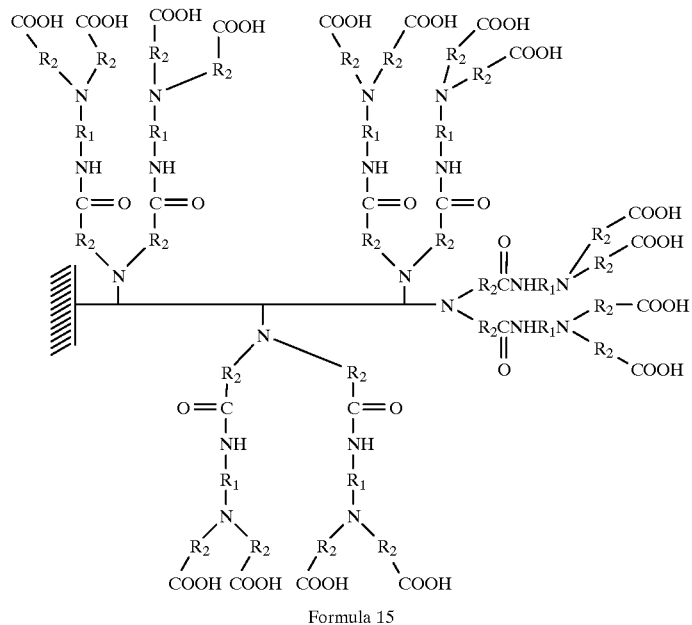

Formula 15

When acrylonitrile is employed as the monomer, a triazine structure can also be deposited (not shown). Acrylonitrile offers additional opportunities for forming highly branched networks of the present invention since a triazine structure offers more than two attachment points for branching when this structure is anchored on the surface.

By using various combinations of functionalities of the monomers employed, the density of the network structure can be controlled. For example, in the process defined by Formulas 1–7, in Step 1, an amine monomer may be employed.

In Step 2, an acid monomer may be employed such as acrylic acid, methacrylic acid, propionic acid, and hexanoic acid. Another class of monomers that can be employed within the scope of the invention, as illustrated in Step 2, are the acrylates. Monomers of this class include but are not limited to methyl acrylate and methylmethacrylate. The hydrocarbon end of the acid or acrylate is substituted for each hydrogen on the amine to form an amide.

The applicants have found that monomers with higher numbers of carbons in their backbone will result in a network structure having a loose network, thereby increasing interstitial spacing between plasma film layers, while those with shorter carbon chains will result in tighter networks.

Additionally, the applicants have found that when using monomers with more than two functional groups, a much higher level of branching can be obtained thereby controlling the network structure. The following examples according to the invention illustrate the employment of different functional densities and different backbone chain lengths to provide a network structure having a loose network, thereby increasing interstitial spacing between plasma film layers as compared to other films for providing access to the functional groups contained therein.

The film network construction can, as an example, be started with a deposition using triethylenetriamine as the monomer. This monomer can be cleaved at the centrally located. $CH_2$—$CH_2$ bond shown as a dotted line in Formula 16 below.

Formula 16

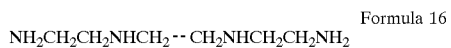

The substrate surface resulting from a plasma deposition using triethylenetriamine is shown below in Formula 8.

STEP 1

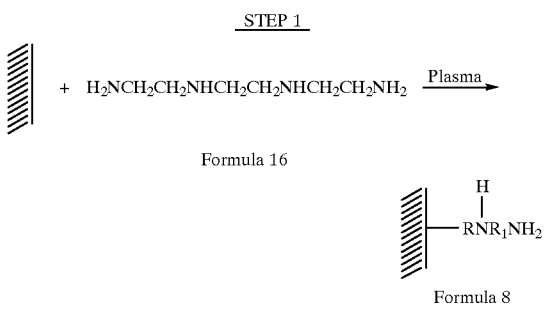

Formula 16

Formula 8

The next layer is then added in Step 2 as follows:

Step 2

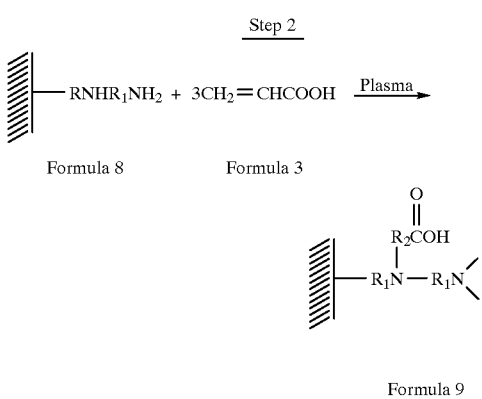

Formula 8   Formula 3

Formula 9

At this stage several options are available. Formula 9 can be reacted with Formula 1 to yield Formula 10 or Formula 9 could be reacted with a trifunctional amine, such as diethylenetriamine, represented by Formula 17 below, to yield Formula 18.

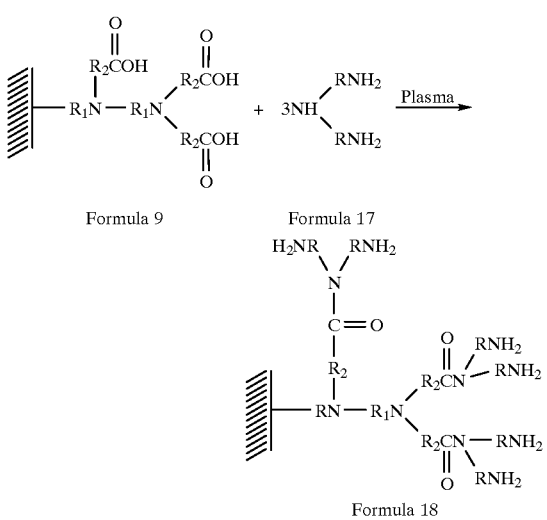

Formula 9   Formula 17

Formula 18

The chemical functional group density of Formula 18 is much different than the chemical functional group density of Formula 10, which was also derived from Formula 9. Thus by mixing and matching the reactive functionality ("monofunctional," "difunctional," "trifunctional" etc.) of the monomer employed, plasma deposited film networks with different morphologies and densities can be provided. Although multifunctional amines and acrylic acid have been employed to illustrate the construction of the plasma deposited film network, it will be apparent to those skilled in the art that the starting film can be constructed from any of the monomers described earlier and combined with the appropriate reactive pair shown in the second column of Table I.

For example, glycidyl methacrylate, Formula 19, could be employed in the first deposition step of the network construction process to yield a surface with the epoxy reactive group, Formula 20, (often referred to as the oxirane group). This epoxide group can now be reacted with an amine, for example, Formula 1, and as suggested in Table I to yield Formula 23 below. Use of a keto ester illustrated by Formula 22 is another source of branching.

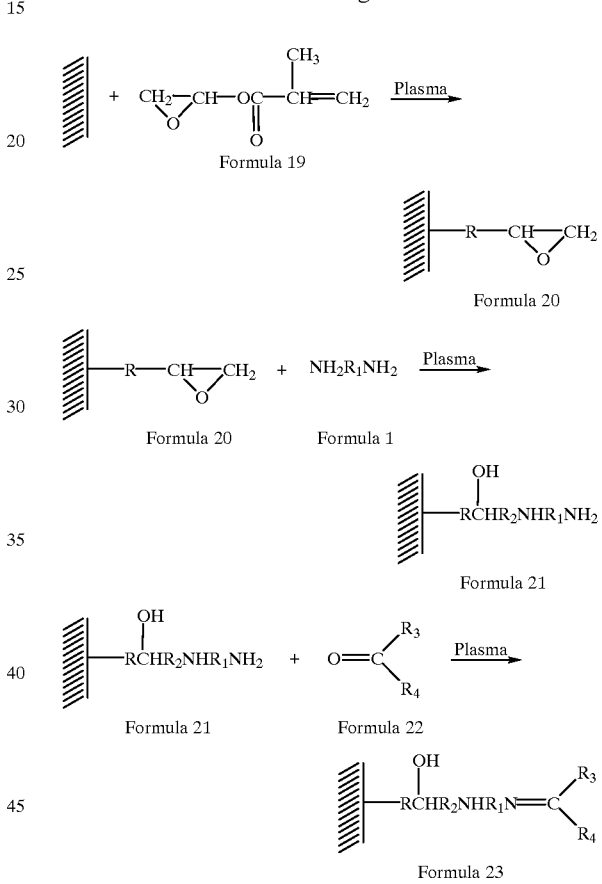

$R_3$ and R4 can be any aliphatic or aromatic groups, aliphatic groups being preferred. $R_3$ and R4 can include a reactive chemical functional group and these sites can be employed to continue to build the film network. Thus the construction of the plasma deposited film network can be accomplished by using the appropriate reactive pairs described in Table I without limitation.

When a network having a open network (i.e., increased interstitial spacing between plasma film layers) is desired, monomers can be chosen such that the central chain can be represented by the notation $(CH_2)_n$ where "n" is sufficiently large. As illustrated below, when the value of six (6) is chosen for "n" in the amine, represented by Formula 24, and a value of two (2) is chosen for "n" in the allylic acid monomer, Formula 26, allyl acetic acid, Formula 28 in Step 2, results.

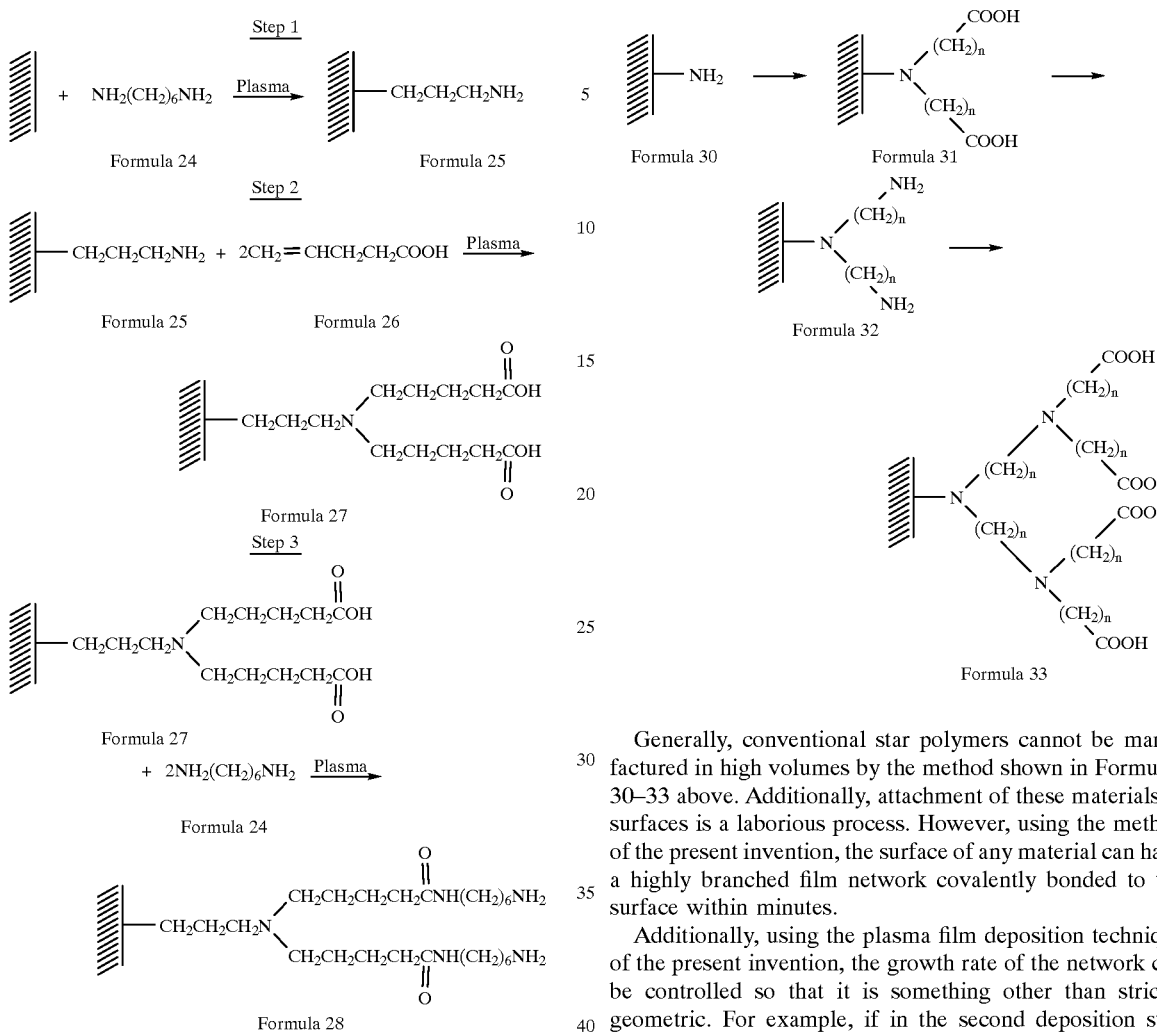

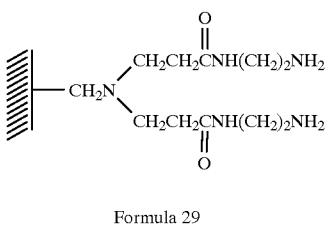

Formula 29

As the structure shown in Formula 28 illustrates, the film network of the present invention has a loose network, thereby increasing interstitial spacing between plasma film layers as compared to the crosslink density and interstitial spacing obtained when ethylene diamine and acrylic acid are reacted using the same three steps illustrated by Formula 29. It will be apparent to those skilled in the art that by using monomers with different central chain lengths and different reactive functionalities, the morphology and the chemical group functionality of the plasma deposited film network can be adjusted in many ways.

In the conventional wet chemical methods employed for building star polymers, the growth of the structure occurs in a geometric fashion as illustrated in the following chemical process:

Generally, conventional star polymers cannot be manufactured in high volumes by the method shown in Formulas 30–33 above. Additionally, attachment of these materials to surfaces is a laborious process. However, using the method of the present invention, the surface of any material can have a highly branched film network covalently bonded to the surface within minutes.

Additionally, using the plasma film deposition technique of the present invention, the growth rate of the network can be controlled so that it is something other than strictly geometric. For example, if in the second deposition step previously described in Formulas 3 and 4, and in more detail in Example 1 below, the acrylic acid deposition process is adjusted such that only part of the amines react, two objectives are accomplished. One is that a network structure having an open network, thereby increasing interstitial spacing between plasma film layers as compared to other films is provided. The other is that some reactive functional groups inside the network structure are retained rather than having all functional groups on the periphery.

According to the invention, a method for preventing reaction of all functional groups employs short deposition times, which only partially covers the previously deposited film. Another method for controlling the crosslink density and interstitial spacing of the network structure and retaining functional reactivity inside the network is shown in Formulas 34–37 below. Here, process conditions are selected such that not all of the functional sites would become growth sites.

For example, by the decreasing the deposition time in the second step of the process, which in the example is the deposition of acrylic acid, from the 2 minute normal process time to 30 seconds, many of the amine functional groups deposited in the first layer are left unreacted. Another method of reducing the reaction between the amine in the first layer and the acrylic acid being deposited is to reduce the flow of acrylic acid while maintaining the same process time. As shown in Formula 35 below, if not all functional sites become growth sites, some reactive functional groups remain within the interstices of the network (shown circled).

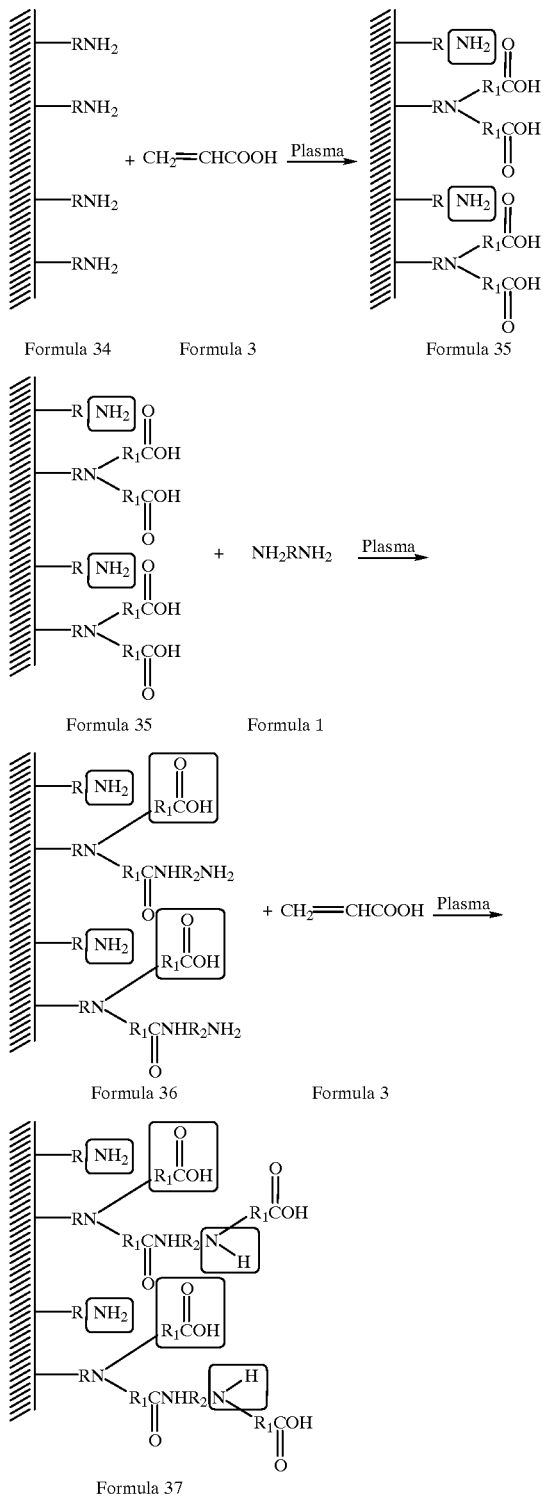

Formula 34   Formula 3   Formula 35

Formula 35   Formula 1

Formula 36   Formula 3

Formula 37

Another method for achieving a plasma deposited film network with chemical functional group in the interstices of the film can be illustrated by the following process scheme. In this case monomers with the epoxy functional group such as

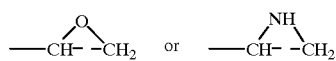

are employed. Once the three-membered ring is opened in the second step, during deposition of an anine, the epoxy group leaves behind a chemical functional group. For example, as previously shown in Formula 19, glycidyl methacrylate could be employed in the first deposition step of the network construction process to yield a surface with the epoxy reactive group, Formula 20, (often referred to as the oxirane group). As shown in Formulas 20–39 below, this surface with the epoxy reactive group, Formula 20, can now be reacted with an amine, for example, Formula 1, and as suggested in Table I to yield Formula 21 below. As Formula 21 illustrates, we are left with a hydroxyl group near the surface and an amine as a terminal group. Formula 21 is also reacted with Formula 19, glycidyl methacrylate, to yield Formula 38, a surface with two epoxy reactive groups. This can again be reacted with an amine to yield, Formula 39, a surface with a plasma deposited film network having functional groups within the interstices of the film layers.

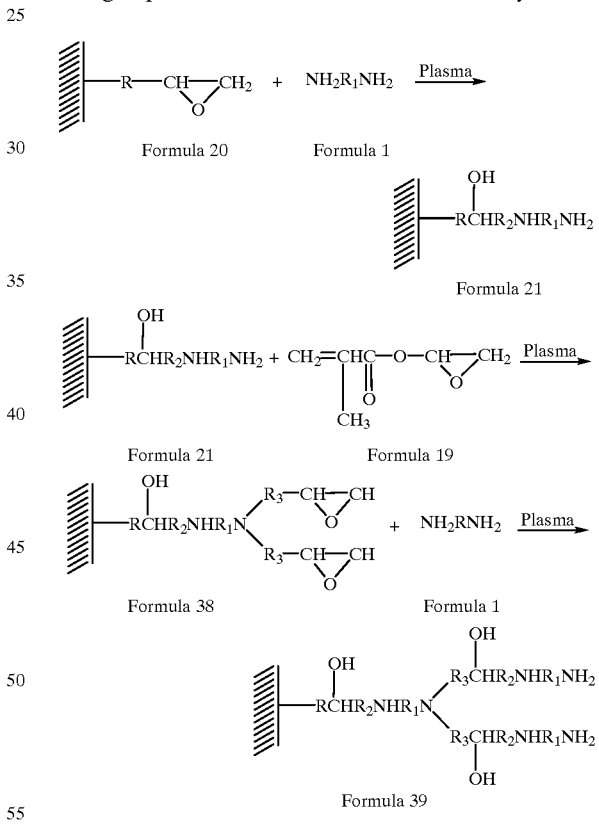

In this manner hydroxy chemical groups can be incorporated in the interstices of the plasma deposited film network while the peripheral chemical groups can be of an entirely different category, such as an amine, by the choice of the monomer employed in the termination step of the deposition process.

Another method for creating chemical functional groups in the interstices of the plasma deposited film network would follow the scheme illustrated in Formulas 1–41 below. In this process, the network construction is initiated with the deposition of an amine, Formula 1, which is then reacted with a ketone, Formula 40, where the ketone group is located such that the chemical groups on either side of the ketone group are of differing length and are terminated with a chemical functional group. When this ketone is now reacted with another monomer (not shown), the longer arm will react more easily, whereas the shorter arm may become protected by steric hindrance, thereby remaining intact within the film structure.

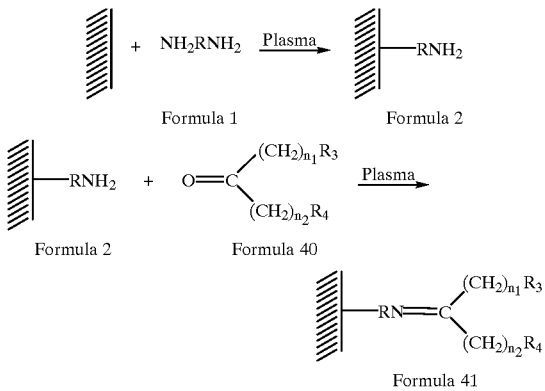

wherein $n_2 >> n_1$.

It is clear from these descriptions that by choosing the particular monomer/process step combinations that are appropriate for the particular goal in mind, a vast array of structural morphologies, chemical group densities, and location of chemical functional groups can be achieved in the plasma deposited film networks described.

The following detailed example illustrates a method of depositing a three-dimensional functional film network according to the invention.

EXAMPLE 1

A 4.0 liter plasma reaction chamber with internal electrodes driven by a 200 watt RF generator operating at 13.56 Mhz is employed. The reaction chamber is connected to an Alcatel 2020 CP vacuum pump with a pumping capacity of 16 cfm. A manual throttle valve was employed to control the reaction chamber pressure independent of the monomer flow.

Step 1: Plasma Polymerization of Ethylene Diamine.

Ethylene diamine is fed to the reaction chamber by evaporating ethylene diamine contained in an Erlenmeyer flask that is maintained at 30° C. The plasma polymerization is conducted at a power setting of 90 watts and a reaction chamber pressure of 420 mTorr. The flow and therefore the residence time of the monomer in the reaction chamber is controlled by the throttle valve. The throttle valve is adjusted so that the actual pressure in the reaction chamber is 480 mTorr. The process time is 3 minutes. These films are deposited on 120 $\mu$m polystyrene beads. Chemical analysis using a ninhydrin test for primary amines shows a concentration of 1.1 $\mu$mole/gm. The surface area of these beads is 476 cm$^2$/gm. The amine concentration measured equates to a surface concentration of 4 nmoles/cm$^2$. This surface density is equivalent to a monolayer of functional groups on the surface.

Step 2: Plasma Polymerization of Acrylic Acid.

In this step, an acrylic acid plasma polymerized film is deposited on top of the amine film deposited in Step 1. The acrylic acid is fed to the reactor by bubbling helium through the monomer contained in an Erlenmeyer flask. The power is set at 100 watts, the helium flow rate is 15 cc/min and the pressure is 500 mTorr. The acrylic acid is maintained in a water bath whose temperature is controlled to 45° C. The flow and therefore the residence time of the monomer in the reaction chamber is controlled by the throttle valve. The throttle valve is adjusted so that the actual pressure in the reaction chamber is 580 mTorr. The plasma is pulsed at 10 Hz and a 10% duty cycle is employed. Deposition of acrylic acid on untreated 180 $\mu$m polystyrene beads under these conditions and a process time of 4 minutes results in a functional density of 2.1 $\mu$mol acid groups/gm. This functional density translates to 6.8 nmoles/cm$^2$. Since we already have approximately 2.3 nmoles/cm$^2$ of amines on the surface and each amine group can add two acrylic acid groups, the process time for this step is 3 minutes. It is assumed that the functional density previously determined is retained in Step 2. Since each amine group can accommodate two acrylic acid groups, Step 2 will incorporate 2.2 $\mu$moles/gm acid groups on the surface.

Step 3: Plasma Polymerization of Ethylene Diamine.

A plasma polymerized film of ethylene diamine is deposited using the same conditions described in Step 1. Step 3 deposits one amine functional group at each of the acid functional sites deposited in Step 2. This results in a final amine concentration of 2.2 $\mu$moles/gm of amine functional group. Chemical analysis using a ninhydrin test for primary amines shows a concentration of 2.8 $\mu$moles/gm of amine functional groups on the surface.

While the foregoing detailed description has described several combinations of sequential deposition of particular classes of monomers for a three-dimensional functional film network in accordance with this invention, it is to be understood that the above description is illustrative only and not limiting of the disclosed invention. Particularly included is a device and method in accordance with this invention that produces a functional film network having a loose network, thereby increasing interstitial spacing between plasma film layers as compared to other films. The network according to the invention has unique conducting properties in that it allows access to functional groups within the interstices of the network. It will be appreciated that various methods to produce various compounds fall within the scope and spirit of this invention.

What is claimed is:

1. A substrate structure, comprising:

a substrate having a surface thereon; and a plurality of radio frequency discharge plasma film layers said film layers being sequentially deposited on said substrate surface, said plasma film layers including a first layer and a second layer at least partially covalently bonded to said first layer;

said second layer having a substantially ordered geometric structure, said structure including a plurality of substantially uniformly dispersed interstitial spaces;

said first layer including a plurality of a first functional group;

said second layer including a plurality of a second functional group.

2. The substrate structure according to claim 1 wherein, said first functional group comprises an amine functional group.

3. The substrate structure according to claim 1 wherein, said second functional group is selected from the group consisting of carboxy, carboxylic ester, epoxy, isocyanate, hydroxy and sulfhydryl.

4. The substrate structure according to claim 1 wherein, said first functional group is selected from the group consisting of carboxy, carboxylic ester, epoxy, amine, isocyanate, hydroxy and sulfhydryl.

5. The substrate structure according to claim 1 wherein, said second functional group is selected from the group consisting of carboxy, carboxylic ester, epoxy, amine, isocyanate, hydroxy and sulfhydryl.

6. The substrate structure according to claim 5 wherein, said second functional group is reactive with said first functional group.

7. The substrate structure according to claim 1 wherein, said geometric structure comprises a dual branched spatial configuration.

8. The substrate structure according to claim 1 wherein, said geometric structure comprises a triple branched spatial configuration.

9. The substrate structure according to claim 1 wherein, said geometric structure comprises a quadruple branched spatial configuration.

10. The substrate structure according to claim 1 wherein, said geometric structure comprises a heterocyclic ring spatial configuration.

11. The substrate structure according to claim 1 wherein, said geometric structure comprises a linear chain spatial configuration.

* * * * *